US010703571B2

(12) United States Patent
Levine et al.

(10) Patent No.: US 10,703,571 B2
(45) Date of Patent: Jul. 7, 2020

(54) SEAMABLE INDUSTRIAL BELT

(71) Applicant: Albany International Corp., Rochester, NH (US)

(72) Inventors: Mark Levine, Appleton, WI (US); Thomas Israel, Appleton, WI (US); Heather Weber, Kaukauna, WI (US); Chad VanHandel, Appleton, WI (US); Douglas England, Appleton, WI (US)

(73) Assignee: Albany International Corp., Rochester, NH (US)

( * ) Notice: Subject to any disclaimer, the term of this patent is extended or adjusted under 35 U.S.C. 154(b) by 0 days.

(21) Appl. No.: 16/260,449

(22) Filed: Jan. 29, 2019

(65) Prior Publication Data

US 2019/0233214 A1  Aug. 1, 2019

Related U.S. Application Data

(60) Provisional application No. 62/623,617, filed on Jan. 30, 2018.

(51) Int. Cl.
*B65G 15/54* (2006.01)
*C08K 5/10* (2006.01)
(Continued)

(52) U.S. Cl.
CPC ............. *B65G 15/54* (2013.01); *B27N 3/002* (2013.01); *B65G 15/32* (2013.01); *B65G 15/34* (2013.01); *C08J 7/04* (2013.01); *C08K 3/36* (2013.01); *C08K 5/10* (2013.01); *C09D 183/04* (2013.01); *C09K 3/16* (2013.01); *D06N 3/0063* (2013.01); *D06N 3/128* (2013.01); *D06N 3/14* (2013.01);
(Continued)

(58) Field of Classification Search
CPC ........ B27N 3/002; B65G 15/34; B65G 15/54; B65G 2201/0282; B65G 2207/10; B65G 15/32; C08J 7/04; C08J 2375/04; C08K 3/36; C08K 5/10; C09D 183/04; C09K 3/16; D06N 3/0063; D06N 3/128; D06N 3/14; D06N 2201/12; D06N 2209/046; D06N 2211/04; B32B 5/022; B32B 5/024; F16F 1/12; F16F 1/16
See application file for complete search history.

(56) References Cited

U.S. PATENT DOCUMENTS 3,120,862 A   2/1964 Burger
3,723,230 A   3/1973 Troutner
(Continued)

FOREIGN PATENT DOCUMENTS

JP    2002-241602 A    8/2002
JP    2009292556 A  * 12/2009  ............. B65G 15/42

OTHER PUBLICATIONS

International Search Report and Written Opinion prepared by the European Patent Office, acting as the International Searching Authority, for corresponding international application PCT/US2019/015535 dated May 17, 2019.

*Primary Examiner* — Mark A Deuble
(74) *Attorney, Agent, or Firm* — McCarter & English, LLP

(57) ABSTRACT

Disclosed is an industrial belt that can be used in, for example, conveying or forming engineered wood composites or other industrial products. The industrial belt has a seamable base belt with a coating that includes a polymer, an anti-contaminant, and a conductive anti-static component.

20 Claims, 2 Drawing Sheets

(51) Int. Cl.
  *C09K 3/16* (2006.01)
  *C09D 183/04* (2006.01)
  *C08K 3/36* (2006.01)
  *C08J 7/04* (2020.01)
  *D06N 3/00* (2006.01)
  *D06N 3/12* (2006.01)
  *B27N 3/00* (2006.01)
  *D06N 3/14* (2006.01)
  *B65G 15/34* (2006.01)
  *B65G 15/32* (2006.01)
  *B32B 5/02* (2006.01)

(52) U.S. Cl.
  CPC .............. *B32B 5/022* (2013.01); *B32B 5/024* (2013.01); *B65G 2201/0282* (2013.01); *B65G 2207/10* (2013.01); *C08J 2375/04* (2013.01); *D06N 2201/12* (2013.01); *D06N 2209/046* (2013.01); *D06N 2211/04* (2013.01)

(56) References Cited

U.S. PATENT DOCUMENTS

| | | | |
|---|---|---|---|
| 3,792,953 A | 2/1974 | Ahrweiler | |
| 3,851,685 A | 12/1974 | Ahrweiler et al. | |
| 3,993,426 A | 11/1976 | Ahrweiler et al. | |
| 4,043,732 A | 8/1977 | Ahrweiler | |
| 4,061,819 A | 12/1977 | Barnes | |
| 4,137,361 A * | 1/1979 | Deffeyes | B22F 1/02 252/512 |
| 4,213,748 A | 7/1980 | Ahrweiler | |
| 5,466,409 A * | 11/1995 | Partridge | A61F 13/15658 264/112 |
| 5,938,007 A | 8/1999 | Fujihiro et al. | |
| 5,985,419 A * | 11/1999 | Schlueter, Jr. | B32B 27/20 399/307 |
| 6,284,678 B1 | 9/2001 | Kobayashi et al. | |
| 7,399,438 B2 | 7/2008 | Clark et al. | |
| 7,438,178 B2 | 10/2008 | Chahal et al. | |
| 8,557,881 B2 | 10/2013 | Lehtinen et al. | |
| 9,056,444 B1 | 6/2015 | Moeller | |
| 9,186,812 B2 | 11/2015 | Battis et al. | |
| 2008/0081179 A1* | 4/2008 | Li | D21F 3/0227 428/332 |
| 2015/0331346 A1* | 11/2015 | Yamauchi | G03G 15/00 492/18 |
| 2016/0200518 A1* | 7/2016 | Lotz | D07B 1/0686 198/847 |
| 2017/0101293 A1* | 4/2017 | Eastman | B66B 7/062 |
| 2018/0305549 A1* | 10/2018 | Papas | F16G 1/16 |

* cited by examiner

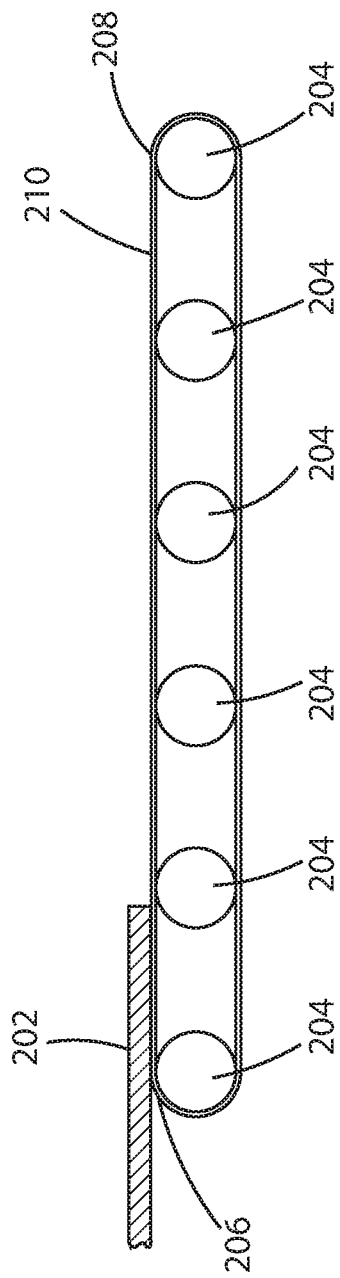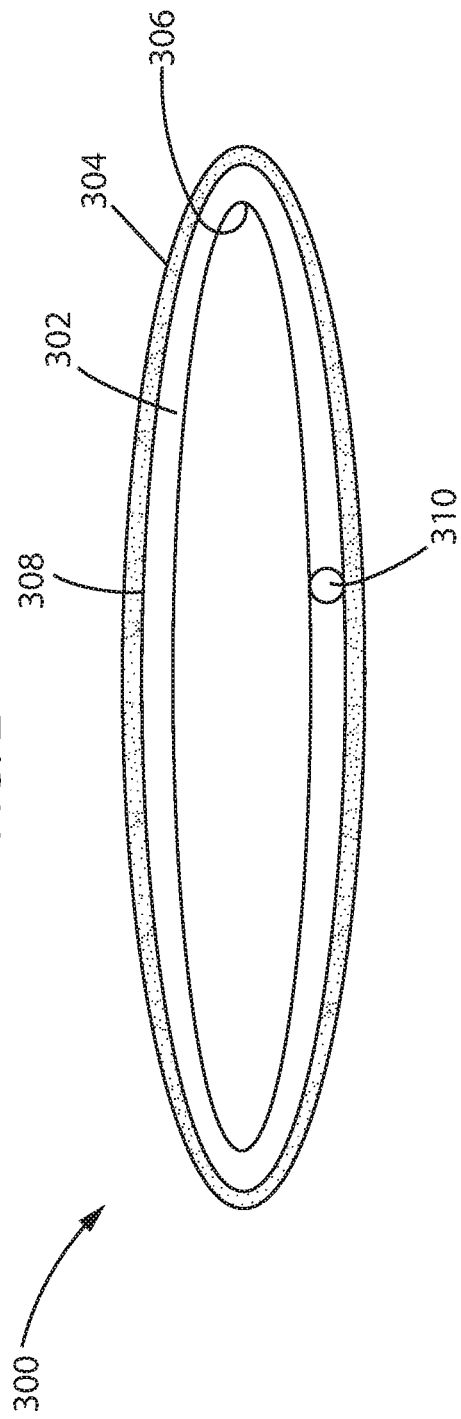
FIG. 2
FIG. 3

SEAMABLE INDUSTRIAL BELT

BACKGROUND

1. Field of the Disclosure

The present invention relates to the field of industrial belts. In particular, the disclosed belt includes a coating to resist adhesion of adhesive components to the belt such as may used in the manufacture of engineered wood products.

2. Related Art

Composites are versatile engineered materials composed of two or more constituent materials which, when combined, lead to improved properties over the individual components while remaining separate on a macroscopic level. Due to their versatility, composite materials are used in a variety of areas ranging from healthcare and civil engineering to spacecraft technology.

Wood-based composite board is typically a panel manufactured from wood materials, primarily in the form of particles (particleboard), flakes (oriented strand board (OSB) or waferboard (random-orientation of flakes), and fibers (medium density fiberboard, MDF), combined with a thermoset adhesive resin and bonded at an elevated temperature and an elevated pressure typically in a hot press. As a result, the process is sometimes referred to as hot pressing.

Numerous types of wood composite products have been manufactured by a process where assemblies of wood pieces, veneers, particles or the like are coated with an adhesive bonding agent, and thereafter subjected to compression and heat to form the end product. For example, this technique is used to manufacture particle board from small wood particles and plywood from wood veneer sheets. Pressure and energy are simultaneously applied to the curable adhesive resins in the wood product. The adhesive resin is thereby cured or set while the product is pressed and/or maintained at the desired dimensions and density. The microwave application cures the resins which are used as binders or adhesives for the composite wood materials.

Belts are used for conveyance, forming or other steps in processes for the manufacture of composite wood products. For example, impermeable belts can be used for forming, or collecting, the composite material and are endless belts which convey and accumulate composite formulations dependent on the final density desired. Permeable belts can be used for de-aerating, or precompressing the formed pre-composite by employing two facing endless belts between which the material is compressed, and platens and antifriction devices which hold the belts in pressure engagement with the material.

As discussed above, wood composite products can include a mixture of wood fibers, fiberglass, and a resin, or adhesive, binder. Resin binders include isocyanate-based resins and formaldehyde-based resins. Isocyanate-based resins can provide environmental benefits over formaldehyde-based resins. However, both isocyanate-based and formaldehyde-based resins have a tendency to adhere to the working surfaces of the steel dies and belts used in processing the composite material. This adhesion tendency can lead to a build-up of resin or composite material on the belt surfaces, which causes undesirable defects in the surface finish of the end product and shortens the life of the belt.

Several approaches have been used to reduce adhesion of resin (adhesive) and build-up on belt surfaces, including the use of an internal release agent in the composite mixture, the application of a release agent on the surface of a mat of the composite mixture prior to pressing the mat, and the application of anti-bonding agents on the belt surface. Various anti-bonding agents involve coating the belt surface with a liquid composition that is baked into the belt to form a stable anti-bonding coating. A build-up will eventually form on the belts over the course of many successive collection or pressing cycles, requiring the belts to be regularly cleaned in place or removed from processing for cleaning/recoating or replacement. Cleaning, removal/recoating or replacement of the belts leads to equipment downtime, added expense, a and waste.

SUMMARY OF THE DISCLOSURE

The present application is directed to an industrial belt and method of making thereof that includes a seamable base belt with a coating over at least a top surface of the base belt. The coating includes a polymer, an anti-contaminant, and a conductive anti-static component.

In one embodiment, the polymer is a thermoplastic polyurethane, the anti-contaminant is a siloxane polymer, and the anti-static component is carbon black. In a particular embodiment, the coating contains at least 70% by weight of the thermoplastic polyurethane, at least 0.5% by weight of the siloxane polymer, and at least 2% by weight of the carbon black.

In another implementation, the percentage of carbon black by weight is sufficient to produce a resistivity of $10^8$ ohms/square or less on a surface of the industrial belt. In another implementation, the siloxane polymer is 1.25%-2.5% by weight. In another implementation of the belt, the thermoplastic polyurethane is based on an ester.

In some implementations, the seamable base belt includes a flat monofilament and a caliper less than 2 mm. In particular implementations, the seamable base belt is a spiral linked belt, a woven belt, nonwoven belt, or a film having embedded machine direction yarns.

BRIEF DESCRIPTION OF THE DRAWINGS

The accompanying drawings, which are included to provide a further understanding of the invention, are incorporated in and constitute a part of this specification. The drawings presented herein illustrate different embodiments of the invention and together with the description serve to explain the principles of the invention. In the drawings:

FIG. 2 illustrates a usage of the belt in the present disclosure.

FIG. 3 illustrates a cross-section of a belt according to the present disclosure.

DETAILED DESCRIPTION

Figure 1:
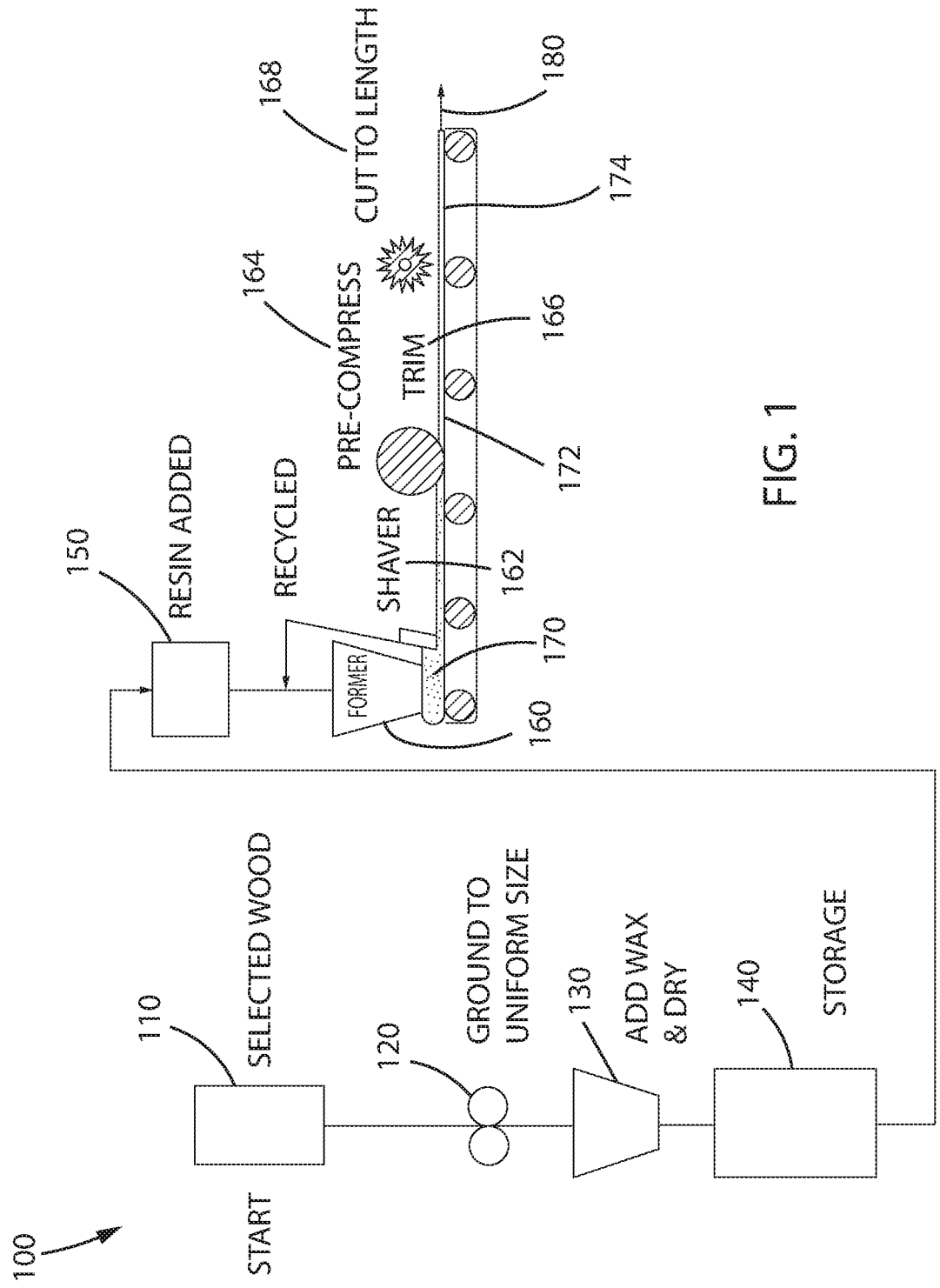
FIG. 1 illustrates a simplified illustration of a basic process that may be used to make a wood composite product.

Terms "comprising" and "comprises" in this disclosure can mean "including" and "includes" or can have the meaning commonly given to the term "comprising" or "comprises" in U.S. Patent Law. Terms "consisting essentially of" or "consists essentially of" if used in the claims have the meaning ascribed to them in U.S. Patent Law. Other aspects of the invention are described in or are obvious from (and within the ambit of the invention) the following disclosure.

The terms "threads", "fibers", and "yarns" are used interchangeably in the following description. "Threads", "fibers", and "yarns" as used herein can refer to monofilaments, multifilament yarns, twisted yarns, textured yarns, coated yarns, bicomponent yarns, as well as yarns made from stretch broken fibers of any materials known to those of ordinary skill in the art. "Tows" include multiple fibers and are referred to herein interchangeably as tows, multifilament tows, multifiber tows, and braided tows. Fibers can be made of carbon, nylon, rayon, fiberglass, cotton, ceramic, aramid, polyester, metal, polyethylene glass, and/or other materials that exhibit desired physical, thermal, chemical, or other properties.

Relative terms such as "up", "down", "top", "bottom", "left", "right", etc. are for convenience of description only and do not represent a requirement of the invention unless otherwise specified as such.

For a better understanding of the invention, its advantages and objects attained by its uses, reference is made to the accompanying descriptive matter in which non-limiting embodiments of the invention are illustrated in the accompanying drawings and in which corresponding components are identified by the same reference numerals.

FIG. 1 illustrates an overview of a simplified process 100 for making a composite wood product. Generally, a selected wood starting material 110 is ground 120 to prepare fibers of a uniform size and the appropriate amount of wax added 130. At this point the preparation may be stored 140 until further processing. The fiber/wax blend is then mixed with an appropriate binder resin 150 until a uniform mixture is formed. It is also common to add the resin to the fiber prior to storage of the fiber.

The mixture may then be formed 160 into a loose mat 170 which is pre-shaped using a shave-off roller 162 and pre-compressed 164 to a desired density of the product 172 is achieved. Further trimming 166 can be performed to the correct size and shape, the pre-pressed mat is introduced into a platen press, and compressed between two dies under conditions of increased temperature and pressure and subsequently cut 168 to a desired size and shape 174. The finished product can be used for products including laminate flooring, engineered flooring, plywood, construction board/oriented strand board (OSB), furniture, countertops, shelving, and such.

As should be understood, in engineered wood processing, where a range of board, chip, fiber, or particles of wood are bound together with adhesives to form the composite materials, belts on rollers 180 are used to direct and convey the starting mixture of wood and adhesive as it moves towards compaction and final curing. Because the wood composite includes an adhesive resin, which can be sticky, the use of a release agent and/or an anti-bonding agent during the manufacture of the wood composite can be sprayed or baked onto surfaces to aid in reducing adherence and build up of resin on the belts and dies during processing.

Adhesive resins for binding particle together are known in the art and are commonly isocyanate or formaldehyde based, although other resins types are contemplated. For example, polymeric diphenyl methane diisocyanate (PMDI), Urea-Formaldehyde (UF), Melamine-Urea-Formaldehyde (MUF), or Phenol-Formaldehyde (PF) resins.

Commonly belts of thermoplastic polyurethane (TPU) or polyvinyl chloride (PVC), reinforced with woven textile, have been employed for directing and conveying the wood composite through the processing of the product. Although these belts are standard today, they are subject to problems in use. First, there may be adhesive build up on the surface of the belt. As discussed above, polyurethane based adhesive formulations (UF, PMDI, etc.) are used for durability and strength. These materials readily adhere to TPU and PVC based products. The build-up of adhesive on the surface of the belt can result in increased surface defects of the final product that may need to be sanded/ground off of the surface. This can lead to increased yield loss and decreased processing speeds.

Second, the belts commonly need to be skived and glued on the machine when replaced or installed. Replacement or installation is difficult because of the complexity, size of the equipment needed, and hazard to personnel.

FIG. 2 illustrates a wood composite conveyance 200 using a belt of the present disclosure in processing the composite to an end product. Belt 210 can be disposed around rollers 204 to support and move the belt. Any number of rollers can be used in this instance and the number shown is not limiting. Wood composite 202 is fed onto the belt 210 at an entry end 206 of the conveyance. Rotation of rollers 204 will cause concurrent rotation of the belt and thereby convey wood composite 202 towards an exit end of the conveyance 208.

FIG. 3 illustrates a cross-section of an embodiment of a belt 300 according to the present application. Belt 300 includes a base belt 302 with an outside surface 304 and an inside surface 306. A coating 308 is adhered to at least the outside side surface 304 of the base belt 302. It is the coating 308 on the outside surface 304 of the belt 300 that will be in contact with, for example, a wood composite. A feature of the belt of the present disclosure is the coated outside surface should not mar the surface of a wood composite being conveyed. However, it is contemplated that the outside surface of the base belt can have a profile if it is desired to form a pattern on a wood composite as part of the processing into an end product.

However, the seamable belts disclosed herein are not limited to use in the manufacture of wood composites. The disclosed belts can find usage in processes including, but not limited to, the production of nonwovens, corrugators, glass, production of sheet for solar panel covers, and lamination in general. Indeed, the disclosed belts can find use anywhere chemical adhesives are applied to substrates for either use in future bonding processes or direct bonding as part of a composite production process. In most of these cases, adhesives may build up on conveying surfaces, which can result in product quality or processing problems. Moreover, the conductive feature of the disclosed belt coating can reduce sparks due to static discharges, which, in turn, may reduce the occurrence of igniting flammable substrates or flammable solvents used for adhesive distribution in a product or process.

Base Belt:

Base belt 302 can be formed of a woven or nonwoven base fabric in the form of endless loops or seamable into such form. Base belt 302 can also be a film having embedded machine direction yarns that is seamable. Fibers of the base fabric can be composed of carbon, nylon, rayon, glass fiber, ceramic, aramid, polyester, metal in forms known to those of ordinary skill and including monofilaments, multifilaments, and braided structures. The fibers can have any shape including flat, round, textured, oval, oblate, or other known shapes. The base belt can have a structure that is single layered, multilayered, or laminated.

In a particular embodiment, the base belt 302 is a spiral linked belt. The spiral link substrate can provide a strong, inelastic structure for the base belt. In this case, the base fabric comprises a plurality of spirally wound yarns and joined turns. The fabric is formed from lengthwise (link) and crosswise (pintle) yarns. The base belt can be pin seamable. Adjacent longitudinal edge portions of adjoining spiral turns may be overlapped and a pintle 310 inserted through the overlapped loops to adjoin the ends to form an endless belt. The loop edges may have a reduced thickness, so as not to give rise to an increased thickness in the area of the overlap. A pin seamable belt can reduce the time required to replace a belt versus that required for the standard skiving and gluing process. A thermoplastic weld can be used alone or in combination to seal the belt surface for increased control of caliper consistency of the belt surface when used for certain end products.

One embodiment of a spiral linked base belt includes the use of flat monofilament based yarns with caliper less than 2 millimeters prior to coating and containing stuffers positioned within selected coils to provide a fabric having a predetermined permeability profile across the width and along the length of the fabric.

Base Belt Coating

Coating 308 covers at least a portion of the outside surface of base belt 302. The outside portion of the belt is that portion that can come in contact with a wood composite, or other composite product, during processing. The coating is comprised of materials that can provide three functions: (1) a durable coating to extend belt life, (2) an anti-contaminant to aid in reducing adherence to the belt of adhesive in a composite, and (3) a component to reduce buildup of static charges on the belt.

In some implementations, the coating 308 may be applied to at least a portion of the outside surface 304 of the belt and also to at least a portion of the inside surface 306 of the belt. In other implementations, a coating applied to the inside surface 306 may be such as to enhance friction between the inside surface of the belt and a surface separate from the belt, such as rollers 204, for example.

The coating can be applied in a variety of methods known to those ordinarily skilled in the art and include various gravure and blade processes using liquid based curable/crosslinkable formulations as well as thermoplastic extrusion or lamination type processes. Typically, methods of coating result in majority mechanical encapsulation of the top strands of the base belt. Adhesion promoters can be added to the formulation of either the base materials or the coating to further enhance coating fixation to the base belt by chemical bonding.

In one implementation, the coating for the belt includes a thermoplastic polyurethane (TPU) or a thermosetting polyurethane. An embodiment of the coating has an ester based TPU, however other TPUs are contemplated. Indeed, the coating may be achieved with materials produced by the reaction of isocyanates with polyols. The properties of the polyurethane can be changed by varying the type or quantity of diisocyanate, short-chain diol, and long-chain diol. In a particular implementation, the coating includes at least 70% TPU by weight.

The coating on the base belt also includes an anti-contaminant to aid in resistance of contaminants accreting on the belt. An embodiment of the coating includes a siloxane polymer as the anti-contaminant. Polydimethylsiloxanes, the most common silicone polymers, consist of a polymeric backbone of alternating silicon and oxygen atoms (siloxane structure) with methyl groups attached to silicon. Methyl groups can be substituted with functional groups to influence compatibility and mobility within a thermoplastic matrix. The number of repeating units can range from one to several thousand to give rise to silicone materials in a large range of molecular weights.

High molecular weight (HMW) silicones, which is defined herein as having viscosities ranging from 10,000 $mm^2$/sec to 60,000 $mm^2$/sec, have been used as internal additives in thermoplastic polymers to give processing advantages and surface property improvements, such as reduced coefficient of friction, improved abrasion resistance, lower wear rates, mold release, easier processing, faster mold cycles and other benefits.

HMW silocones impart expected silicone benefits to plastics, often more efficiently and more effectively than lower molecular weight silicones, but are more difficult to handle. In a particular implementation, the coating includes at least 0.5% of a HMW siloxane polymer by weight. In another particular implementation, the coating has a HMW siloxane polymer between 1.25-2.5% by weight.

The base belt may include siloxane polymer, as discussed above for the coating, in areas of the base belt that are not covered with the coating. In some implementations, the base belt can include siloxane polymer throughout the base belt.

The coating on the belt also includes a conductive component to provide conductivity for dissipation of any build up of electrostatic charges. An embodiment of the coating includes carbon black as the conductive component. Carbon black as used herein includes subtypes including acetylene black, channel black, furnace black, lamp black and thermal black. In a particular implementation, the coating includes at least 18% of the conductive component by weight and some implementations include coatings having at least 25% of the conductive component by weight. It is also possible to employ formulations containing more conductive types of carbon black, carbon nanotubes, and other similar formulations in quantities as low as 2% (by weight) sufficient to produce surface resistivity of $10^6$ ohms/square or less to neutralize static charges.

In some implementations, the industrial belt may be formed to be substantially impermeable to either water, air, or other fluids. Some industrial belts can be entirely impermeable or impermeable in selected portions.

Other implementations of the invention are within the scope of the following claims.

The invention claimed is:

1. An industrial belt, comprising:
   a seamable base belt; and
   a coating over at least a top surface of the base belt,
   wherein the coating includes a polymer of at least 70% by weight of a thermoplastic polyurethane, at least 0.5% by weight of a siloxane polymer, acting as an anti-contaminant, and a conductive anti-static component; and
   wherein the percentage of conductive anti-static component by weight is sufficient to produce a resistivity of $10^6$ ohms/square or less on a surface of the industrial belt.

2. The industrial belt according to claim 1, wherein the anti-static component is a carbon black.

3. The industrial belt according to claim 2, wherein the coating includes
   at least 2% by weight of the carbon black.

4. The industrial belt according to claim 1, wherein the thermoplastic polyurethane is based on an ester.

5. An industrial belt, comprising:
   a seamable base belt; and
   a coating over at least a top surface of the base belt, wherein the coating includes a polymer of at least 70% by weight of a thermoplastic polyurethane, 1.25%-2.5% by weight of a siloxane polymer, acting as an anti-contaminant, and a conductive anti-static component.

6. An industrial belt, comprising:
a seamable base belt comprising a flat monofilament and a caliper less than 2 mm; and
a coating over at least a top surface of the base belt,
wherein the coating includes a polymer of at least 70% by weight of a thermoplastic polyurethane, at least 0.5% by weight of a siloxane polymer, acting as an anti-contaminant, and a conductive anti-static component.

7. The industrial belt according to claim 6, wherein the seamable base belt is a spiral linked belt.

8. The industrial belt according to claim 6, wherein the seamable base belt is a woven belt.

9. The industrial belt according to claim 6, wherein the seamable base belt is a nonwoven belt.

10. The industrial belt according to claim 6, wherein the seamable base belt is a film having embedded machine direction yarns.

11. A method of forming an industrial belt, comprising:
fabricating a seamable base belt; and
coating at least a top surface of the base belt;
wherein the coating includes a polymer of at least 70% by weight of a thermoplastic polyurethane, at least 0.5% by weight of a siloxane polymer, acting as an anti-contaminant, and a conductive anti-static component; and
wherein the percentage of the conductive anti-static component by weight is sufficient to produce a resistivity of $10^6$ ohms/square or less on a surface of the industrial belt.

12. The method according to claim 11, wherein the anti-static component is a carbon black.

13. The method according to claim 12, wherein the coating includes at least 2% by weight of the carbon black.

14. The method according to claim 11, wherein the thermoplastic polyurethane is based on an ester.

15. A method of forming an industrial belt, comprising:
fabricating a seamable base belt; and
coating at least a top surface of the base belt,
wherein the coating includes a polymer of at least 70% by weight of a thermoplastic polyurethane, 1.25%-2.5% by weight of a siloxane polymer, acting as an anti-contaminant, and a conductive anti-static component.

16. A method of forming an industrial belt, comprising:
fabricating a seamable base belt with a flat monofilament and a caliper less than 2 mm; and
coating at least a top surface of the base belt;
wherein the coating includes at least 70% by weight of a thermoplastic polyurethane, at least 0.5% by weight of a siloxane polymer, acting as an anti-contaminant, and a conductive anti-static component.

17. The method according to claim 16, wherein the seamable base belt is a spiral linked belt.

18. The method according to claim 16, wherein the seamable base belt is a woven belt.

19. The method according to claim 16, wherein the seamable base belt is a nonwoven belt.

20. The method according to claim 16, wherein the seamable base belt is a film having embedded machine direction yarns.

* * * * *